United States Patent
Hilditch

(10) Patent No.: US 7,234,440 B2
(45) Date of Patent: Jun. 26, 2007

(54) FUEL INJECTION STRATEGY FOR REDUCED COLD START EMISSION FROM DIRECT INJECTION GASOLINE ENGINES

(75) Inventor: James Hilditch, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/240,018

(22) Filed: Sep. 29, 2005

(65) Prior Publication Data

US 2007/0068485 A1 Mar. 29, 2007

(51) Int. Cl.
F02B 5/00 (2006.01)
F02B 31/00 (2006.01)

(52) U.S. Cl. ...................... 123/305; 123/299

(58) Field of Classification Search ............... 123/299, 123/304, 305, 434, 179.16, 179.17
See application file for complete search history.

(56) References Cited

U.S. PATENT DOCUMENTS

| | | | |
|---|---|---|---|
| 5,119,780 A * | 6/1992 | Ariga | 123/300 |
| 5,127,378 A | 7/1992 | Ito | |
| 5,207,058 A | 5/1993 | Sasaki et al. | |
| 5,794,586 A * | 8/1998 | Oda et al. | 123/305 |
| 5,979,400 A | 11/1999 | Nishide | |
| 5,992,373 A | 11/1999 | Hosoya et al. | |
| 6,016,653 A * | 1/2000 | Glassey et al. | 60/274 |
| RE36,737 E | 6/2000 | Brehob et al. | |
| 6,209,525 B1 | 4/2001 | Konishi et al. | |
| 6,425,367 B1 * | 7/2002 | Hiraya et al. | 123/299 |
| 6,475,251 B1 | 11/2002 | Ahmadi | |
| 6,725,835 B2 | 4/2004 | Joos et al. | |
| 7,059,296 B2 * | 6/2006 | Strom et al. | 123/305 |
| 2004/0011332 A1 | 1/2004 | Djordjevic | |
| 2004/0134462 A1 * | 7/2004 | Strom et al. | 123/294 |
| 2004/0173180 A1 * | 9/2004 | Strom et al. | 123/299 |
| 2005/0090966 A1 * | 4/2005 | Strom et al. | 701/109 |
| 2006/0016423 A1 * | 1/2006 | Kuo et al. | 123/299 |

FOREIGN PATENT DOCUMENTS

EP 0837239 2/2002

OTHER PUBLICATIONS

Donald Stanton and Christopher Rutland, "Modeling Fuel Film Formation and Wall Interaction in Diesel Engines", SAE Technical Paper 960628, Engine Research Center, University of Michigan—Madison.

* cited by examiner

Primary Examiner—John T. Kwon
(74) Attorney, Agent, or Firm—Allan J. Lippa; Alleman Hall McCoy Russell & Tuttle, LLP

(57) ABSTRACT

A system, comprising of an engine having a cylinder therein, a fuel injector coupled to said cylinder and configured to directly inject fuel into said cylinder, a fuel system coupled to said injector, and a controller configured to control engine starting operation, wherein during a start, said fuel injector performs a first fuel injection at least partially during an exhaust stroke of said cylinder, where fuel from said first fuel injection is mixed with air inducted at least during an intake stroke following said exhaust stroke, said fuel injector performing a second fuel injection after said first fuel injection, and combusting fuel from said first and second fuel injections to perform a combustion event in said cylinder.

23 Claims, 5 Drawing Sheets

Timing of Events

FUEL INJECTION STRATEGY FOR REDUCED COLD START EMISSION FROM DIRECT INJECTION GASOLINE ENGINES

BACKGROUND AND SUMMARY

Strategies have been developed in order to reduce the tailpipe hydrocarbon emissions produced during vehicle startup while simultaneously obtaining reliable combustion and increasing exhaust heat for catalyst heating. In one example, intake port fuel injection can be used to provide a selected air-fuel ratio for combustion. In another example, direct fuel injection may be used to improve control over fuel delivery during a cold start.

One approach to facilitating fuel injection control in a direct injection engine during startup is described in U.S. Pat. No. 5,794,586. In this approach, a fuel injection control system provides a means of delivering fuel in a single low pressure injection during startup. In particular, the approach relies on a single injection of fuel initiated late in the exhaust stroke that persists throughout the intake stroke in order to facilitate the vaporization of the fuel during cold start applications. In this manner, the fuel may be pre-heated by the exhaust residuals remaining in the combustion chamber from the subsequent operating cycle.

The inventors herein have recognized a disadvantage with such an approach. Specifically, a single injection occurring late in the exhaust stroke and continuing into the intake stroke may cause excessive piston wetting. For example, some of the fuel that is injected at or near top dead center may form a film on the piston that can decrease air and fuel mixing and thus increase hydrocarbon emissions, at least under some conditions such as engine cold starting.

In one approach, the above issues may be addressed by a system, comprising of an engine having a cylinder therein; a fuel injector coupled to said cylinder and configured to directly inject fuel into said cylinder; a fuel system coupled to said injector; and a controller configured to control engine starting operation, wherein during said start, said fuel injector performs a first fuel injection at least partially during an exhaust stroke of said cylinder, where fuel from said first fuel injection is mixed with air inducted at least during an intake stroke following said exhaust stroke, said fuel injector performing a second fuel injection after said first fuel injection, and combusting fuel from said first and second fuel injections to perform a combustion event in said cylinder.

In this way, it may be possible to achieve improved vaporization via the first injection at least partially during the exhaust stroke. Further, it may be possible to achieve this vaporization while reducing piston wetting by using at least a second injection event during engine cold starting. In other words, the combination of the first and second separate injection can enable less fuel injection near top dead center, thereby reducing piston wetting. Finally, by utilizing at least two injections, it may be possible to deliver the desired fuel to meet the desired combustion torque to start the engine.

Also, note that there are various forms of direct fuel injectors that may be used, such as a cylinder side-wall located injector, or an injector mounted in a cylinder head above the piston. Further, the piston may be configured in various ways to direct the fuel into the cylinder. In some embodiments, low pressure fuel system having a single fuel pump located in or near the fuel tank or located near the engine may be used among others. In some embodiments, dual stage fuel injection systems may be also be used. Further, engine start may include various types of starting, such as starting from rest, starting from a crank speed, engine run-up, engine idle operation following run-up, and various others or combinations thereof.

DETAILED DESCRIPTION OF THE DRAWINGS

DETAILED DESCRIPTION

Figure 1:
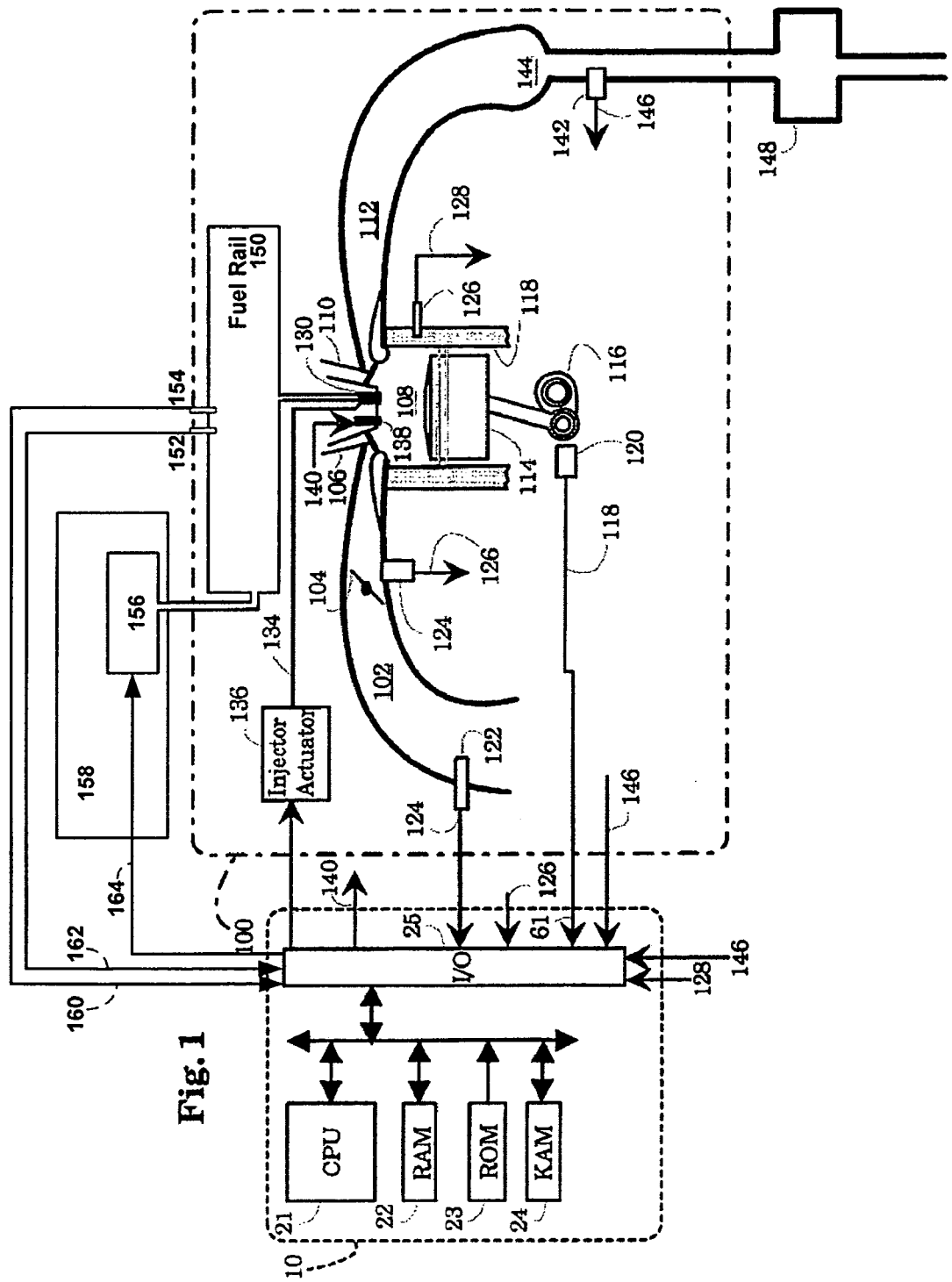
FIG. 1 shows an internal combustion engine with a low pressure direct injection fuel system.

FIG. 1 of the drawings shows an Electronic Engine Controller (EEC) 10 and an internal combustion engine 100, which comprises a plurality of cylinders, one of which is shown in FIG. 1. Engine 100 draws an aircharge through an intake manifold 102, past a throttle plate 104, and intake valve 106 and into combustion chamber 108. An air/fuel mixture which includes air supplied by the intake valve and/or exhaust valve and fuel injected by fuel injector 130 is ignited in combustion chamber 108, and exhaust gas produced from combustion of the air/fuel mixture is transported past exhaust valve 110 through exhaust manifold 112. A piston 114 is coupled to a crankshaft 116, and moves in a linear fashion within a cylinder defined by cylinder walls 118.

A crankshaft position sensor 120 detects the rotation of crankshaft 116 and transmits a crankshaft position signal 118 to EEC 10. Crankshaft position signal 118 may take the form of a series of pulses, each pulse being caused by the rotation of a predetermined point on the crankshaft past sensor 120. The frequency of pulses on the crankshaft position signal 118 can be indicative of the rotational speed of the engine crankshaft. A Mass AirFlow (MAF) sensor 122 detects the mass flow rate of air into intake manifold 102 and transmits a representative signal 124 to EEC 10. MAF sensor 122 may take the form of a hot wire anemometer, in one embodiment. Alternatively, or in addition, a manifold pressure sensor may be used. A throttle position sensor 124 detects the angular position of the throttle plate 104 and transmits a signal 126 indicative of throttle position to EEC 10. Throttle position sensor 124 may take the form of a potentiometer or other position transducer. An engine coolant temperature sensor 126 detects the temperature of engine coolant circulating within the engine and transmits a representative signal 128 to EEC 10. A fuel injector 130 is positioned to inject fuel directly into combustion chamber 108. Fuel injector 130 receives fuel from a low pressure fuel supply pump 156, and injects fuel into combustion chamber 108 in response to an injector control signal 134 received from injector driver 136, which operates under control of EEC 10. Fuel injector 130 preferably takes the form of a solenoid valve. Optionally, a high pressure fuel pump (not shown) may be included between pump 156 and rail 150.

Low pressure fuel pump 156 supplies fuel from fuel tank 158 in response to a pressure control signal 164 received from the EEC. The fuel pump 156 supplies fuel to fuel rail 150. Pressure sensor 154 detects the pressure of the fuel within fuel rail 150 and transmits a representative signal 160 to EEC 10. Temperature sensor 152 detects the temperature of the fuel within fuel rail 150 and transmits a representative signal 162 to EEC 10.

A spark plug 138 operates under control of a spark timing signal 140 generated by the EEC 10 to ignite the air/fuel mixture in the combustion chamber 108. A Heated Exhaust Gas Oxygen (HEGO) sensor 142, positioned to sense exhaust gas flowing through exhaust pipe 144, transmits an exhaust composition signal 146, which is indicative of the oxygen concentration of the exhaust gas, to EEC 10. A three-way catalytic converter 148 processes exhaust gases to reduce emissions.

EEC 10 includes a central processing unit (CPU) 21 for executing stored control programs, a random-access memory (RAM) 22 for temporary data storage, a read-only memory (ROM) 23 for storing the control programs, a keep-alive-memory (KAM) 24 for storing learned values, a conventional data bus and I/O ports 25 for transmitting and receiving signals to and from the engine 100 and other systems in the vehicle.

One embodiment advantageously implements a routine to control the injection mode/timing in a manner to reduce hydrocarbon emissions during various operating conditions, such as during engine cold start and/or hot re-start conditions. Specifically, referring to FIG. 2, the routine addresses both cold starts and/or hot re-start conditions through the selection of an injection mode/timing based on various operating conditions, which may include coolant temperature, ambient temperature and pressure, the number of previous combustion events, and/or combinations thereof.

The routine begins at 210 where it is judged whether a prescribed number of combustion events have occurred. In one example, the routine counts the number of combustion events from a first combustion event of the engine during startup. As described below, during a first number of combustion events (such as at least one in each cylinder of the engine), a single injection may be used, such as during the intake stroke or other strokes, to provide a desired engine run-up profile and create at least some burnt gas residual.

Continuing with 210, if it is judged that a prescribed number of combustion events (E1) have not occurred, the routine proceeds to enter Crank/Run-up Mode at 212. Next, the routine proceeds to 214 where the air/fuel ratio and spark timing are adjusted to achieve the desired combustion. Next, the routine proceeds to 216 where single or multiple injections performed during the intake and/or compression stroke may be used to fuel the combustion chamber. Further, the crank run-up mode may be used until idle speed control is achieved or a certain number of combustion events are achieved.

Referring to 210, if it is judged that a prescribed number of combustion events (E1) have previously occurred, the routine proceeds to 218. At 218 it is judged whether a cold start condition exists by the comparison of engine coolant temperature to a temperature threshold (T1). Likewise, other engine conditions may be utilized for determining cold start conditions, such as catalyst temperature, ambient temperature, etc. If the answer to 218 is no, the routine proceeds to 220 where it is judged whether to enter a hot restart mode.

Alternatively, if the answer to 218 is yes, the routine proceeds to 226 where an injection mode is selected. As described herein, the number of injections per cylinder (and/or per combustion cycle) can vary depending on operating conditions, such as engine and/or catalyst starting temperatures, and the number of combustion events that have occurred. However, additional parameters may also be considered, such as fuel temperature, fuel blend (which can affect fuel vaporization performance), fuel rail pressure, battery voltage, combinations thereof, and others. In 226, the routine selects between available injection modes (where example modes are described below herein).

Under conditions where a first injection mode is selected at 226, the routine continues to 228 where a first injection mode is used, where at least one injection is performed at least partially during at least one of: the exhaust stroke, the intake stroke and/or the compression stroke in order to facilitate the vaporization of fuel from the heat of the exhaust gas residuals. Alternatively, if a second injection mode is selected, the routine continues to 234 were a double injection is carried out as described below. Finally, if a third injection mode is selected, the routine continues to 242 where an injection strategy having three or more injections is chosen as described below. The duration, timing, relative amounts/ratios, etc. of the various fuel injection modes will be discussed in more detail below and further illustrated in FIGS. 4 and 5. Note that in one embodiment the spark timing utilized can be adjusted based on the fuel injection mode. For example, different ignition timing may be used in for a single injection event versus a dual injection event. In this way, the spark timing can be adjusted to account for different amounts of mixing and/or vaporization.

Referring to 228, wherein the first injection mode is selected, the routine proceeds to 230 where the air/fuel ratio, fuel quantity and spark timing are adjusted to achieve rapid warm up of the engine and associated catalyst. Next, the routine proceeds to 232 where a single or multiple injections of fuel are performed at least partially the exhaust, intake and/or compression strokes.

Referring to 234, wherein the second injection mode is selected, the routine proceeds to 236 where the air/fuel ratio, fuel quantity and spark timing are adjusted with regard to a double injection strategy. Next, the routine proceeds to 238 where a first partial injection is initiated during the exhaust stroke. Next, the routine proceeds to 240 where a second injection is initiated at a time later in the operating cycle.

For example, if the first injection occurs during the exhaust stroke and terminates prior to the piston reaching TDC (top dead center of piston motion) (in order to reduce piston wetting), the second injection may occur during the subsequent intake stroke to complete the fueling of the combustion chamber prior to combustion. Additional example injection timings will be discussed below and further illustrated in FIGS. 4 and 5.

Referring to 242, wherein the third injection mode is selected, the routine proceeds to 244 where the air/fuel ratio, fuel quantity and spark timing are adjusted with regard to a multiple injection strategy. Next, the routine proceeds to 246 where a first partial injection is initiated during the exhaust stroke. Next, the routine proceeds to 248 where a second injection is initiated at a time later in the operating cycle. Next, the routine proceeds to 250 where a third injection is initiated at a time after the second injection.

For example, in one embodiment of the multiple injection strategy, the first injection may be initiated during the exhaust stroke and terminates prior to the piston reaching TDC. Next, the second injection may be utilized throughout, or during a portion of, the intake stroke. Finally, a third injection may be utilized at least partially during the compression in order to complete the injection process and create a homogenous, and/or stratified or partially stratified charge around the spark plug for improved ignition robustness. Additional example injection timings will be discussed below and further illustrated in FIGS. 4 and 5.

Figure 2:
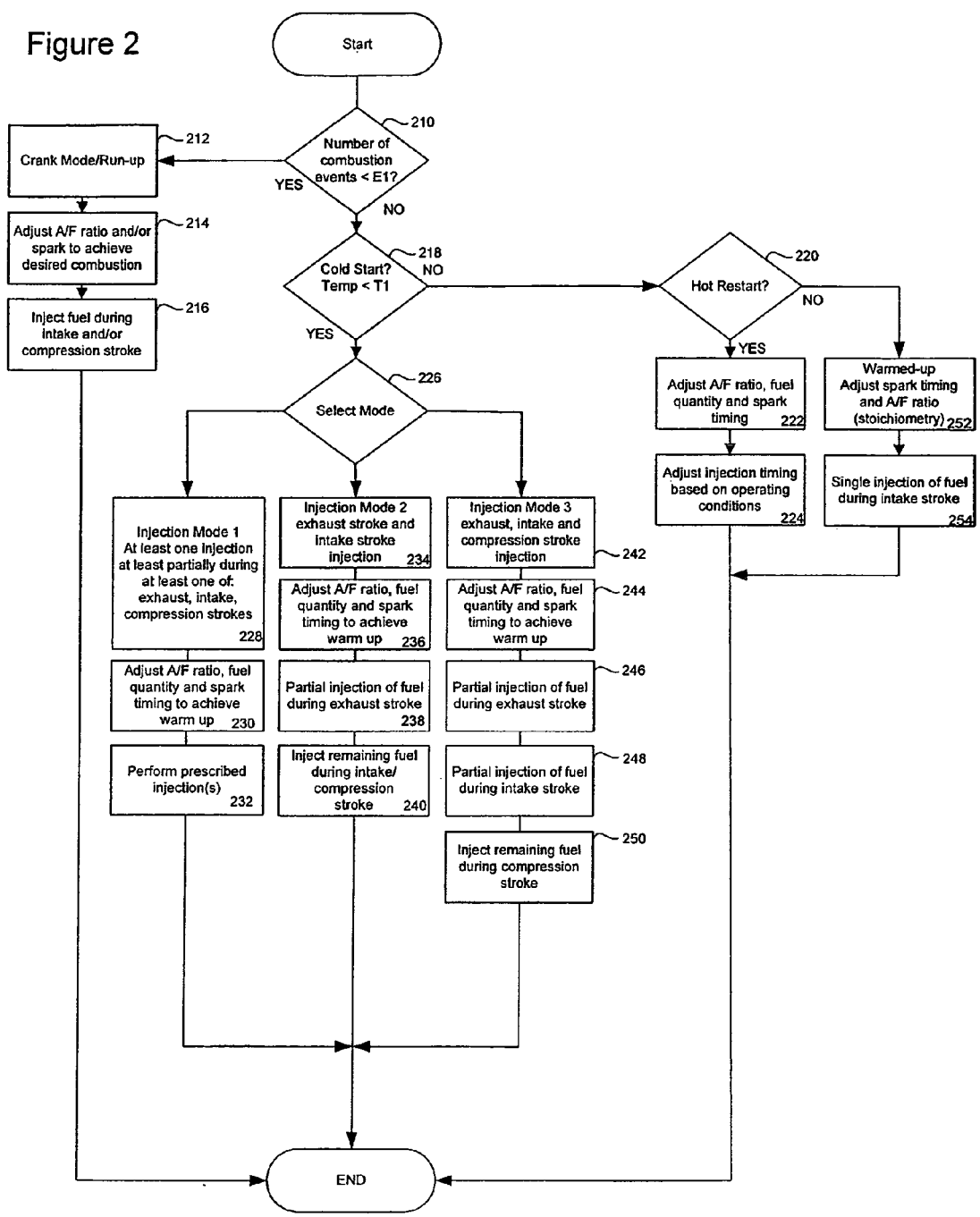
FIG. 2 is a flow chart showing an example routine for controlling fuel injection strategy.

The amount of fuel delivered during each injection of a split injection strategy may vary. For example, a range of between 20% and 80% of the total amount of fuel required by the combustion cycle may be utilized at each stage of the injection process in order to deliver the total desired fuel quantity. Furthermore, the total amount of fuel injected during a split injection strategy may vary since fuel may be utilized more effectively by the engine due to improved vaporization and reduced wetting. The total amount of fuel delivered and/or the relative amounts of each injection may also vary depending on engine operating conditions, including: valve timing, engine speed, coolant temperature, air temperature, air pressure and the number of previous combustion events, etc. In one embodiment, the ratio between a first and second fuel injection for a given combustion event may vary from event to event based on catalyst temperature. In this way, it is possible to account for increasing residual temperatures as exhaust temperatures rise thereby affecting vaporization of fuel injected during and exhaust stroke and/or intake stroke. The routine shown in FIG. 2 is just one example of an engine control strategy. In some embodiments the routine may include more or less modes than shown in FIG. 2.

Continuing with FIG. 2, referring to 220, where the routine judges whether a hot restart mode exists based on coolant or catalyst temperature, etc. If the answer to 220 is yes, the routine proceeds to 222 where the air/fuel ratio, fuel quantity and spark timing are adjusted with regard to a hot restart condition. Next, the routine proceeds to 224, where a single injection pulse, at least during some conditions, is utilized.

In one embodiment, a single injection per cylinder may be utilized since the engine heat retained from previous engine operations creates engine conditions conducive to fuel vaporization. Whereas, in another embodiment, the injection strategy may include multiple injections during some starting conditions (such as hot engine or ambient conditions), where an exhaust injection pulse is utilized as described above. However, the engine may also utilize only a single injection during other starting conditions (such as cold engine and/or ambient conditions).

Continuing with FIG. 2, in 222, the routine can adjust the amount of fuel in the single injection to adjust air-fuel ratio based on the time since engine start, or the number of combustion events from the start of the engine. Finally, in 224, the routine can adjust the spark timing during the start based on engine operating conditions, such as air-fuel ratio, temperature, and the number of combustion events from the start, or combinations thereof.

When the answer to 220 is no, the routine continues to 252 to execute a warmed-up injection strategy where the air/fuel ratio is maintained at approximately stoichiometry. Next, the routine proceeds to 254 where a single injection is utilized at least partially during an intake stroke.

In this way, the overall injection strategy, as demonstrated by FIG. 2, may improve engine warm up by utilizing split injection modes where applicable, with regard to engine operating conditions, in order to facilitate fuel vaporization, while at the same time reducing piston wetting. Further, as noted above, multiple injections may be used under some engine starting conditions, but not others. In this way, it is possible to further improve overall engine starting under a variety of operating conditions.

Figure 4A:
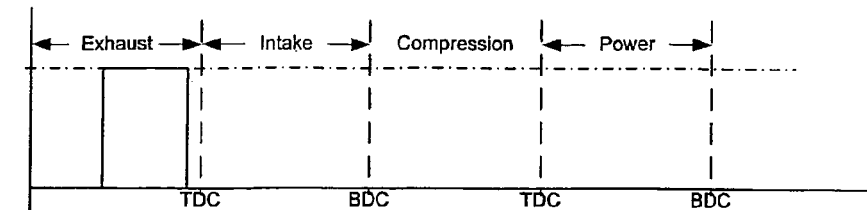
FIG. 4 is a timing diagram showing an example timing of injection pulses.

The graphs shown in FIGS. 4A through 4G illustrate several example injection timings for single, double and triple injection strategies. FIG. 4A shows a single injection performed during the exhaust stroke where the fuel is later combusted in a subsequent stroke of the operating cycle. During the exhaust stroke of FIG. 4A, a single injection provides the total fuel required for combustion, thus taking advantage of the residual heat remaining in the combustion chamber from the previous combustion event for improved vaporization of fuel. Although a fuel injection taking place during the exhaust stroke may incidentally exhaust the fuel prior to combustion, the single injection shown in FIG. 4A may occur later in the exhaust stroke in order to reduce the incidental exhaust of the fuel.

Figure 4B:
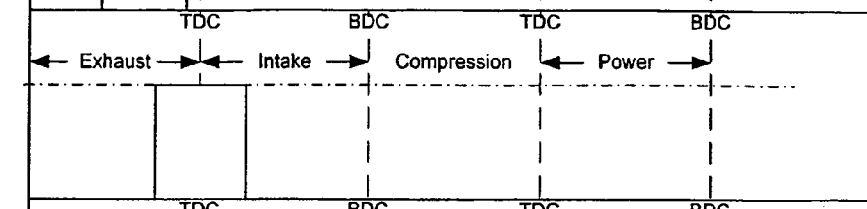

FIG. 4B also shows a single fuel injection, where the injection occurs late in the exhaust stroke and continues into the intake stroke. Although under some conditions, injecting fuel through TDC may produce some wetting, there may be other conditions, such as with higher temperatures, where significant wetting does not occur. Alternatively, even if wetting is produced, the effects may be mitigated by processing any increased emissions in a warmed-up catalyst.

Figure 4C:
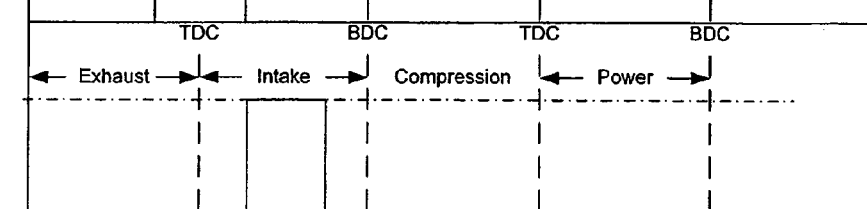

FIG. 4C shows a third example of a single fuel injection, where the injection occurs during the intake stroke and terminates prior to reaching TDC of the compression stroke.

Figure 4D:
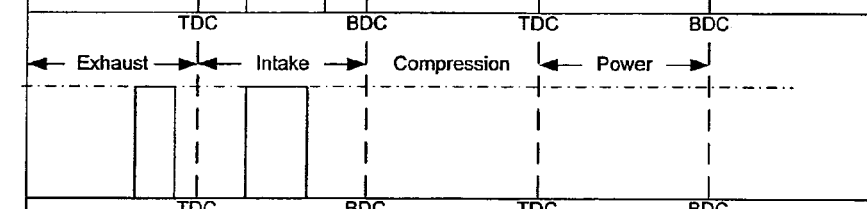
Figure 4E:
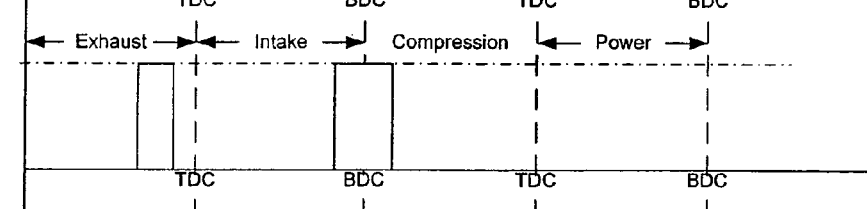

Referring FIG. 4D, an example of a double injection strategy is shown. The first injection, where a portion of the total fuel is injected during the exhaust stroke, is used to facilitate the vaporization of fuel, while a second injection occurring later in the operating cycle may be used to deliver the remainder of the fuel. FIG. 4E also shows a double injection, where instead the timing of the second injection is delayed until late in the intake stroke and continues into the compression stroke.

Figure 4F:
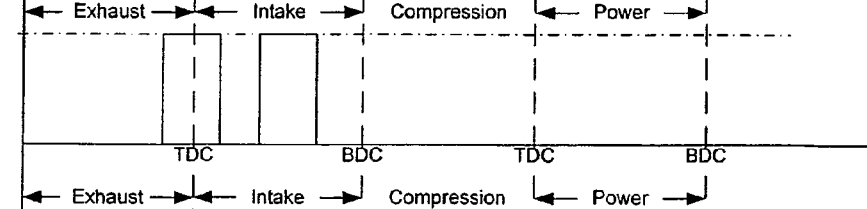

FIG. 4F shows a double injection strategy where the first injection occurs late in the exhaust stroke and continues into the intake stroke. The second injection occurs during the intake stroke.

Figure 4G:
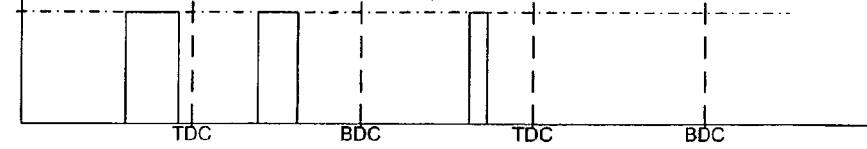

FIG. 4G shows an example triple injection strategy. The first injection, during the exhaust stroke, is vaporized through the aid of the residual exhaust gas. Next, a second injection may occur during the intake stroke. Finally, the remaining fuel may be injected during the compression stroke in order to create a stratified or partially stratified charge around the spark plug for improved ignition robustness. The final fuel injection may occur early enough in the compression stroke to avoid significant back pressure so that a low pressure fuel system may be used.

The beginning and end times of the fuel injections demonstrated by FIG. 4 are for illustrative purposes only as it should be appreciated that the initiation and duration of injection events may vary depending on operating conditions, which may include the number of previous combustion events, engine speed, coolant temperature, air temperature, air pressure, combinations thereof, and various others, as indicated.

Figure 5:
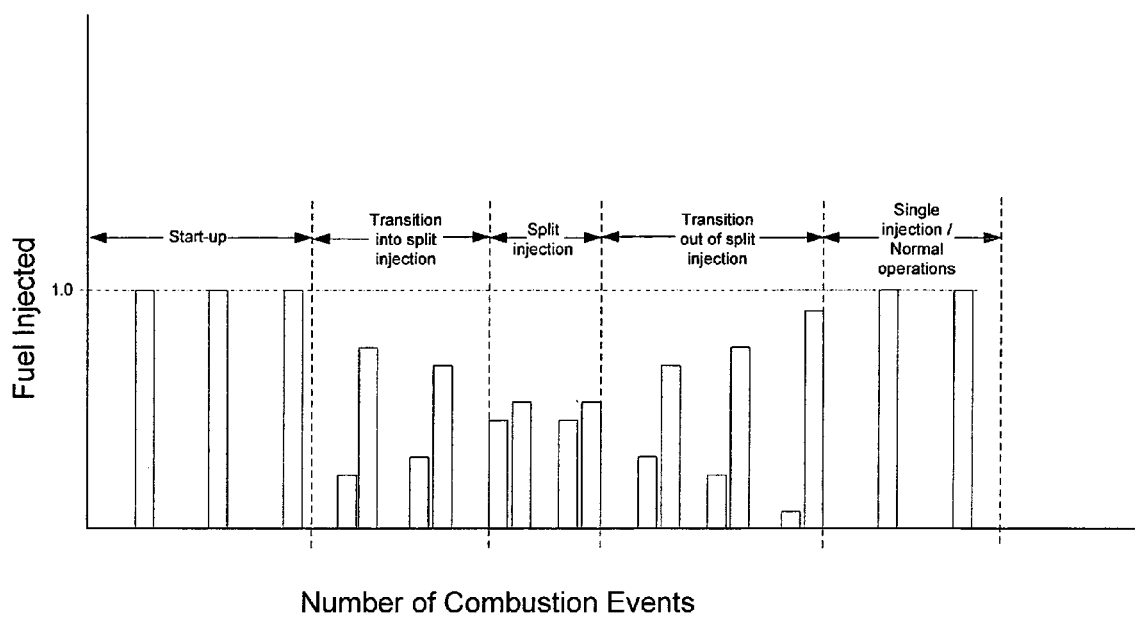
FIG. 5 is a timing diagram showing an example injection timing transition.

In one embodiment of the application, a cold start injection strategy may transition between single, double and multiple fuel injections based on various engine operating conditions or alternatively a prescribed number of subsequent combustion events. FIG. 5 shows an example timing diagram for a transitional injection strategy. The horizontal axis of the graph represents the previous number of combustion events that have occurred while the vertical axis represents the amount of fuel delivered with each injection.

Note that in any or all of the above examples, the controller may vary the start and/or end timing of the injection pulses based on operating conditions to vary the timing of the fuel delivery and/or the amount of fuel delivered in a given injection. For example, the controller may vary the start and/or end timings and/or relative amounts of fuel between different injections during the same event, or from cycle to cycle, as engine speed changes, barometric pressure varies, valve timing changes, catalyst temperature changes, engine coolant temperature changes, exhaust temperature changes, or combinations thereof. In one particular embodiment, the routine may adjust the relative amounts of a first and second injection as exhaust temperature increases. In another embodiment, the routine may adjust the timing of a first injection as exhaust temperature increases. In still another embodiment, the routine may select different injection modes during an engine start based on operating conditions.

Referring to FIG. 5, for example, after cranking, a single injection mode may be utilized during the crank/run-up period in order to achieve combustion and create a modicum of residual heat. After a prescribed number of combustion events or once exhaust gas temperature reaches a selected value, a transition to a split injection mode may commence wherein a first injection occurs, for example, during the exhaust stroke while a second subsequent injection may occur during the intake stroke. When appropriate, based on engine coolant temperature or other operating conditions, a transition to a normal engine operating mode may occur, wherein a single injection mode may once again be utilized. A similar timing strategy as demonstrated by FIG. 5 could likewise be shown for a multiple injection application as well as for additional variations of injection timing and duration.

As described above herein, in one embodiment, a split injection strategy using an exhaust stroke injection can take advantage of heat generated by the exhaust residuals remaining in the combustion chamber from a previous combustion event in that cylinder. Subsequent fuel injections may also occur during the intake and compression strokes in order to complete the fueling process and create a homogenous, and/or stratified or partially stratified charge around the spark plug for improved ignition robustness. In this way, combustion stability and efficiency are enhanced through the reduction of surface wetting thus further reducing emissions. Furthermore, by controlling the quantity and timing of fuel injected into the combustion chamber, the rapid warming of the catalyst may occur, thereby further reducing tailpipe hydrocarbon emissions.

Further, when using a lower pressure direct injection system, there may be insufficient heat for the vaporization of fuel. As such, an injection of fuel during the exhaust stroke may be utilized to facilitate fuel vaporization wherein the injection will be combusted later in the operating cycle. On the other hand, injecting fuel near top dead center (TDC) of the exhaust stroke may create excessive wetting of the piston. Therefore, a balance may be struck between the desired vaporization of fuel and the amount of piston wetting tolerated through the use of a split injection strategy.

As noted above, in one embodiment, the split fuel injection strategy may utilize two or three injections in order to accomplish the desired fueling of the combustion chamber. For example, a small injection may occur late in the exhaust stroke, which facilitates vaporization of the fuel, while a second and/or third injection(s) may occur during or across subsequent strokes of the operating cycle in order to deliver the remaining fuel for combustion. In this way, it is possible to mitigate piston wetting by reducing the amount of fuel injected near or around top dead center of the exhaust stroke, while at the same time facilitating vaporization of the fuel through the utilization of a partial injection, which takes advantage of the residual heat of the exhaust stroke.

Figure 3:
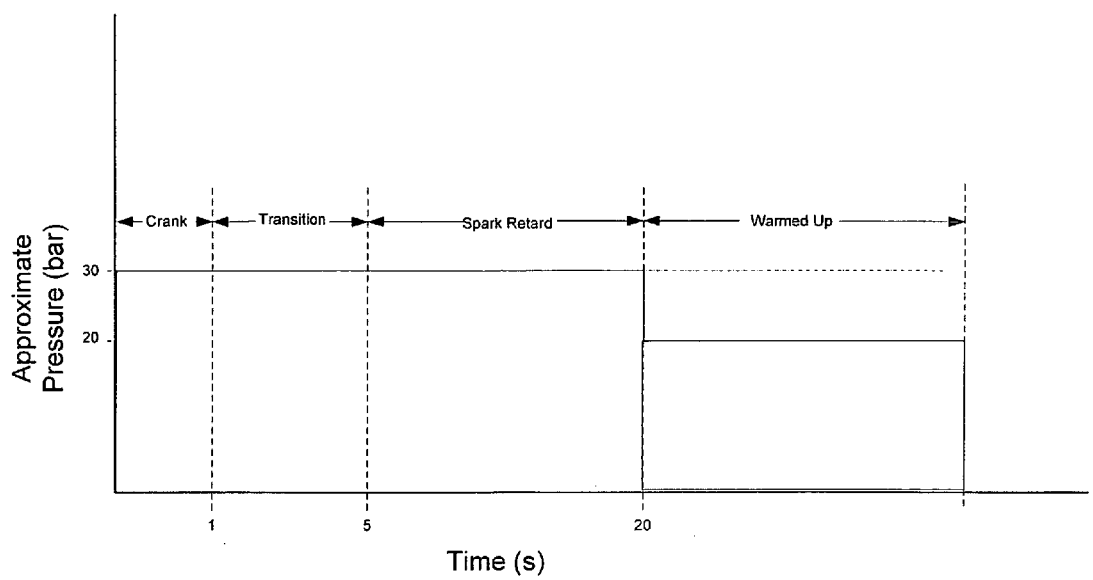
FIG. 3 is an example diagram for controlling fuel rail pressure over time.

Referring to FIG. 3, an example diagram is shown describing how fuel rail pressure may vary with time after engine startup. In this example embodiment, during the crank/run-up period, the low pressure pump will supply approximately 30 bar of pressure to the fuel rail. The fuel pressure may be maintained at 30 bar by a single stage low pressure pump throughout a transition and spark retard region. When the operating conditions are judged sufficient, typically at a time of approximately 20 seconds after ignition, the pressure supplied by the pump may be reduced to approximately 20 bar for warmed-up operating conditions. While in this example, the pressure varies between 20 and 30 bar, various other pressure may be used, such as less than 40 bar, or others.

Note that the control and estimation routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A system, comprising:
an engine having a cylinder therein;
a fuel injector coupled to said cylinder and configured to directly inject fuel into said cylinder;
a fuel system coupled to said injector; and
a controller configured to control engine starting operation, wherein during a start, said fuel injector performs a first fuel injection at least partially during an exhaust stroke of said cylinder, where fuel from said first fuel injection is mixed with air inducted at least during an intake stroke following said exhaust stroke, said fuel injector performing a second fuel injection after said first fuel injection, and combusting fuel from said first and second fuel injections to perform a combustion event in said cylinder.

2. The system of claim 1 wherein at an amount of at least one of said first fuel injection and said second fuel injection is varied with an operating condition.

3. The system of claim 2 wherein at least one of said first fuel injection amount and said second fuel injection amount is varied as barometric pressure varies.

4. The system of claim 2 wherein at least one of said first fuel injection amount and said second fuel injection amount is varied as engine coolant temperature varies.

5. The system of claim 2 wherein said first fuel injection amount is varied as ambient temperature varies.

6. The system of claim 2 wherein a timing of said first fuel injection is varied as engine speed varies.

7. The system of claim 2 wherein a timing of said first fuel injection is varied as at least one of a cylinder charge varies or an exhaust valve timing varies.

8. The system of claim 2 wherein said first fuel injection amount is varied as a number of engine combustion events varies.

9. The system of claim 1 wherein a ratio of an amount of said first fuel injection and an amount of said second fuel injection varies with an operating condition.

10. The system of claim 9 wherein said ratio varies with engine coolant temperature.

11. The system of claim 10 wherein said ratio varies with a number of engine combustion events.

12. The system of claim 1 wherein said controller is further configured to perform a third fuel injection that is mixed with fuel from both said first fuel injection and said second fuel injection and then combusted.

13. The system of claim 1 wherein said fuel system is a low pressure system having a pressure less than approximately 40 bar.

14. The system of claim 1 wherein said starting operation occurs after at least a first combustion event has occurred in said cylinder.

15. A system, comprising:
an engine having a cylinder therein;
a fuel injector coupled to said cylinder and configured to directly inject fuel into said cylinder;
a low pressure fuel system having a pressure less than approximately 40 bar coupled to said injector; and
a controller configured to control engine starting operation, wherein during said start and after at least a first combustion event has occurred in said cylinder, said fuel injector performs a first fuel injection at least partially during an exhaust stroke of said cylinder, where fuel from said first fuel injection is mixed with air inducted at least during an intake stroke following said exhaust stroke, said fuel injector performing a second fuel injection after said first fuel injection, and combusting fuel from said first and second fuel injections to perform a combustion event in said cylinder.

16. The system of claim 15 wherein a ratio of an amount of said first injection and an amount of said second injection varies as an operating condition varies.

17. The system of claim 16 wherein said operating condition is barometric pressure.

18. The system of claim 16 wherein said operating condition is engine coolant temperature.

19. The system of claim 16 wherein a timing of at least one of said first fuel injection and second fuel injection varies as an operating condition varies.

20. The system of claim 16 wherein said controller further operates said fuel injector to perform a third fuel injection after said second fuel injection, where the engine combusts in a single event fuel from said first, second, and third injection.

21. A system, comprising:
an engine having a cylinder therein;
a fuel injector coupled to said cylinder and configured to directly inject fuel into said cylinder;
a low pressure fuel system coupled to said injector; and
a controller configured to control engine starting operation, wherein during said start and after at least a first combustion event has occurred in said cylinder and under a first condition, said fuel injector performs a first fuel injection during an exhaust stroke of said cylinder, where fuel from said first fuel injection is mixed with air inducted at least during an intake stroke following said exhaust stroke and combusted to generate engine torque, and during said start and under a second condition, said fuel injector performing a first fuel injection during an intake stroke of said cylinder, where fuel from said first fuel injection is mixed with air inducted at least during an intake stroke and combusted to generate engine torque.

22. A system, comprising:
an engine having a cylinder therein;
a fuel injector coupled to said cylinder and configured to directly inject fuel into said cylinder;
a low pressure fuel system coupled to said injector; and
a controller configured to control engine starting operation, wherein during said start and after at least a first combustion event has occurred in said cylinder, said fuel injector performs a single fuel injection during an exhaust stroke of said cylinder, where fuel from said first fuel injection is mixed with air inducted at least during an intake stroke following said exhaust stroke and combusted in said cylinder.

23. The system of claim 1, further comprising a spark plug and wherein fuel from said first and second fuel injections are combusted by a spark performed by the spark plug.

* * * * *